(12) United States Patent
Busser et al.

(10) Patent No.: US 9,197,652 B2
(45) Date of Patent: Nov. 24, 2015

(54) METHOD FOR DETECTING ANOMALIES IN A CONTROL NETWORK

(75) Inventors: Jens-Uwe Busser, München (DE); Jan Kästner, Malsch (DE); Michael Munzert, Gräfelfing (DE); Christof Störmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 13/497,461

(22) PCT Filed: Aug. 12, 2010

(86) PCT No.: PCT/EP2010/061786
§ 371 (c)(1),
(2), (4) Date: Mar. 21, 2012

(87) PCT Pub. No.: WO2011/032789
PCT Pub. Date: Mar. 24, 2011

(65) Prior Publication Data
US 2012/0198277 A1  Aug. 2, 2012

(30) Foreign Application Priority Data

Sep. 21, 2009 (DE) .......................... 10 2009 042 407
Dec. 7, 2009 (EP) ..................................... 09015135

(51) Int. Cl.
*G06F 11/00* (2006.01)
*H04L 29/06* (2006.01)
(Continued)

(52) U.S. Cl.
CPC .......... *H04L 63/1416* (2013.01); *G06N 99/005* (2013.01); *H04L 43/08* (2013.01); *H04L 63/1408* (2013.01); *H04L 63/1425* (2013.01); *H04L 63/1433* (2013.01)

(58) Field of Classification Search
CPC ............ H04L 63/1416; H04L 63/1433; H04L 63/1425; H04L 63/1408; H04L 63/145; H04L 63/1441; H04L 63/1458; H04L 43/10; H04L 43/08; H04L 41/142; G06N 99/005; G06N 5/04; G06N 5/02
See application file for complete search history.

(56) References Cited

U.S. PATENT DOCUMENTS 7,971,253 B1 *   6/2011  Gupta ............................ 726/23
2005/1024921     11/2005  Peng
(Continued)

FOREIGN PATENT DOCUMENTS

CN   101060443 A   10/2007
EP   1 708 414     10/2006
(Continued)

OTHER PUBLICATIONS

Mannila, H.; Toivonen, H.; and Verkamo, A.; "Discovery of Frequent Episodes in Event Sequences", 1997, Kluwer Academic Publishers, Data Mining and Knowledge Disocvery 1, pp. 259-298.*
(Continued)

*Primary Examiner* — Eleni Shiferaw
*Assistant Examiner* — Gregory M Elmore
(74) *Attorney, Agent, or Firm* — Cozen O'Connor

(57) ABSTRACT

A method for monitoring and controlling, industrial or building automation to detect anomalies in a control network, wherein a technology of an intrusion detection system (IDS) is configured to analyze a time sequence and time intervals of correct messages in the network traffic and to use the messages to train an anomaly detection system. Detecting a time sequence and a rhythm of correct messages allows for the detection of malfunctions or manipulations of devices and attacks that are performed using regular monitoring or control stations that have been taken over by attackers or that are defect, and that cannot be detected using content-based methods or by a considerable increase of data traffic. An additional security barrier is thus provided that can continue monitoring and protecting a technical unit from possible acts of sabotage, even if the control network of the technical unit has already been corrupted.

11 Claims, 3 Drawing Sheets

(51) Int. Cl.
  *G06N 99/00* (2010.01)
  *H04L 12/26* (2006.01)

(56) References Cited

U.S. PATENT DOCUMENTS

2006/0010388 A1* 1/2006 Imhof et al. .................. 715/734
2007/0074272 A1* 3/2007 Watanabe ......................... 726/3

FOREIGN PATENT DOCUMENTS

EP         1 879 350       1/2008
WO    WO 2008/067442    6/2008

OTHER PUBLICATIONS

Mannila, H.; Toivonen, H, A.; "Discovery of Frequent Episodes in Event Sequences", 1997, Kluwer Academic Publishers, Data Mining and Knowledge Discovery 1, pp. 259-298.*

Mannila, H.; Tolvonen, H, A.,; "Discovery of Frequent Episodes in Event Sequences", 1997, Kluwer Academic Publishers, Data Mining and Knowledge Discovery 1, pp. 259-298.*

Ge, X.; Smyth, P.; "Deformable Markov Model Templates for Time-Series Pattern Matching", Mar. 2000, Technical Report UCI-ICS 00-10, Department of Information and Computer Science, University of California, Irvine.*

Mannila, H.; Tolvonen, H.; Verkamo, A.: "Discovery of frequent episodes in event sequences", in Data Mining and Knowledge Discovery 1, Kluwer Academic Publishers, 1997, pp. 259-298.

Ge, X.; Smyth, P: "Deformable Markov model templates for time-series pattern matching", in Proceedings of the 6th ACM SIGKDD International Conference on Knowledge Discovery and Data Mining, Boston, MA, Aug. 2000, pp. 81-90; Magazine.

Schlüssler, T.; Goglin, S.; Johnson, E.: "Is a bot at the Controls? Detecting Input Data Attacks", in Proceedings of the 6th ACM SIGCOMM NetGames, Melbourne, Australien, Sep. 2007.

Zhang, Jun; "Large-scale Network Anomaly Detection Based on Multi-feature Similarity"; pp. 6, 8-16, 39, and 43-46; CN; Sep. 15, 2007.

* cited by examiner

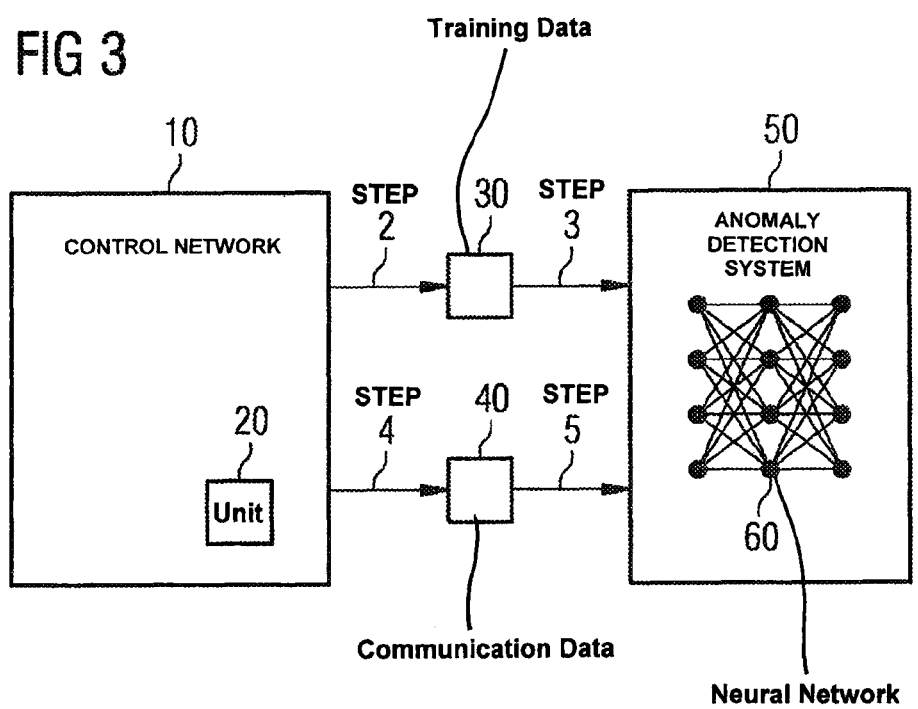

METHOD FOR DETECTING ANOMALIES IN A CONTROL NETWORK

CROSS-REFERENCE TO RELATED APPLICATIONS

This is a U.S. national stage of application No. PCT/EP2010/061786 filed 12 Aug. 2010. Priority is claimed on German Application No. 10 2009 042 407.5 filed 21 Sep. 2009 and European Application No. 09015135.8 filed 7 Dec. 2009, the contents of which are incorporated herein by reference in its entirety.

BACKGROUND OF THE INVENTION

1. Field of the Invention

The present invention relates to communication network security and, more particularly, to a method for detecting anomalies in a control network, which can be used to detect anomalies that cannot be detected using measures known from the prior art.

2. Description of the Related Art

The linking of a large number of computers and local networks to form a worldwide network (the Internet) in recent decades has greatly enhanced the effectiveness and user-friendliness of numerous processes in business, government and private sectors. Unfortunately, the increasing complexity of the applications has also meant a huge rise in the number of inherent errors and vulnerabilities, which allow malevolent third parties to abuse such systems for their own purposes. Although manufacturers try increasingly to reduce such vulnerabilities at an early stage during software development implementing appropriate programming techniques and quality assurance processes, and to eliminate them as soon as possible once they have become known, every year the number of vulnerabilities becoming known in IT systems continues to increase.

IT-based monitoring and control systems, generally also known as supervisory control and data acquisition (SCADA) systems, distributed control systems (DCS) or energy management systems (EMS), are in the meantime also being used in many technical units, such as industrial units, factories and power plants, for power, water and gas distribution as well as oil and gas pipelines. In the past, these systems differed from conventional IT systems in that they were operated in total isolation in physically protected areas and in particular often used communication protocols not normally used in the IT environment. A high level of reliability is the highest priority here. Fast response times in the region of milliseconds are essential for communication between field devices (e.g., for protection functions for energy transportation and distribution). In contrast to the IT environment information, security was of lower priority, as such automation networks were already intrinsically secure or were not connected to insecure networks.

Such systems are now increasingly also connected to other networks to form a comprehensive control network to achieve greater increases in efficiency. Thus, for example, a manufacturing control system (MCS) is connected to a manufacturing execution system (MES) and this (or both) is/are in turn connected to an enterprise resource planning (ERP) system, which is one of the company's office software applications. Technical units at different sites communicate over leased lines or even completely public networks. Access is set up for the remote maintenance of units. Information from public networks (e.g., time, weather forecast or raw materials prices from the supplier) can even form part of the operation of a technical unit.

Increasing networking gives rise to control networks that are easier to attack, because the intrinsic protection resulting from the isolation of the individual systems is increasingly absent. As in the conventional IT environment, there is then an increasing need to update unit parts in respect of security and keep them updated. However, this continual updating is often not possible, because corresponding corrections or patches (if available) cannot be loaded during ongoing operation, if they require the respective systems to be restarted. Maintenance breaks are also often not adequate for this purpose, because other work has to be performed during these periods. Consequently, even known security vulnerabilities are not eliminated from control networks over a number of years. The deployment of virus scanners is also problematic, because when deployed they can have a seriously adverse effect on unit control due to performance impairment as a result of the scanning devices and also due to the blocking of files and programs identified (in some instances incorrectly) as harmful.

The closest possible monitoring of a control network of a technical unit, i.e., for network-based attacks, is therefore essential to be able to institute appropriate timely measures and to avoid downtime of the technical unit with in some instances serious consequences for people, equipment and the environment.

A control network is used, depending on the technical unit in question, for control and monitoring purposes in industrial and building automation. In industrial automation control networks control, for example, factories or power plants as well as power, water or gas distribution and they are also used for oil and gas pipelines.

Until now, control networks have rarely been monitored in respect of security; reliance is usually still placed on the (presumed) isolation of the control network in respect of production control and a lack of knowledge of corresponding protocols and devices on the part of potential attackers, who generally come from the traditional IT environment. With the increasing connection of networks, however, the growing experience of attackers and their increasing motivation and commercial potential, this strategy is becoming less and less successful.

Intrusion in a control network can be detected using a conventional intrusion detection system (IDS), as long as the attack or interference is still ongoing.

The most widely used intrusion detection systems (e.g., SNORT) mainly operate in a signature-based manner. Such signatures have to be generated in a complex manner to detect individual attacks. When an installed intrusion detection system is configured, the patterns of relevant attacks have to be selected and made known to the intrusion detection system, for example, as a configuration file. As soon as new vulnerabilities become known or attacks on already known vulnerabilities are modified, new signatures have to be generated and the intrusion detection system configuration file has to be extended correspondingly.

Other known traffic analysis approaches detect scanning and flooding attacks based on major changes in traffic volume in the Transmission Control Protocol/Internet Protocol (TCP/IP) layer.

All the above-mentioned and further measures (e.g., firewalls, application gateways, DMZ, security cells) are suitable for protecting the control network. However, there is little protection for the actual technical unit, if the control network has already (as always) been corrupted and taken over. It is then possible to collect detailed information about unit processes with regular commands. The technical unit can then be removed from control by adjusting actuators.

SUMMARY OF THE INVENTION

It is therefore an object to provide a method for detecting anomalies in a control network, which can be used to detect anomalies that cannot be detected using measures known from the prior art.

This and other objects and advantages are achieved in accordance with the invention by providing a method in which a microprocessor is programmed to perform five steps to thereby detect anomalies in a control network. In the first step, communication data is detected in the control network. In the second step, a time sequence and/or time intervals of correct messages in the communication data is/are detected and stored in training data. In the third step, an anomaly detection system is trained using the training data. In the fourth step, current communication data is detected in the control network. Finally, in the fifth step, the anomaly detection system is used to check the time sequence and/or time intervals of the correct messages in the current communication data for a deviation from the training data.

The invention also comprises a computer program, which is processed in a computer, thereby executing the method with the steps described above. The computer program here can be stored on non-transitory computer-readable data medium.

In accordance with the method of the invention, a time sequence and/or time intervals of correct messages is/are detected in the communication network, stored in training data and used to train the anomaly detection system (and thus later to identify deviations).

By thus detecting a time sequence and "rhythm" of correct messages, it becomes possible to detect attacks, which are performed using regular observation or control stations that have been taken over by attackers, and which cannot be detected either using content-based methods (by signatures or byte sequence analysis) or by a marked increase in data traffic.

Attacks can also be detected, which are made possible, for example, by taking over a regular and authorized device, with which an attacker comes into possession of confidential cryptographic keys. It is thus possible to detect attacks that do not differ from normal behavior either in the content of their messages (such as use of other protocols, unusual requests, or incorrect Hash-based Message Authentication Codes (HMACs) or signatures or in their paths (incorrect sender or recipient) and cannot therefore be detected by byte pattern detecting methods.

It is possible to use technologies of network-based intrusion detection systems (NIDS) and also device-based intrusion detection systems (HIDS). It is advantageous to install the anomaly detection system on one or more servers.

One advantage of the method in accordance with the invention lies in the analysis of a behavior over time (sequence, rhythm) of correct messages between regular authorized devices as a further, new criterion for monitoring the security of the control network.

The method creates a further security barrier, which can continue to monitor and protect (by raising an alarm with security personnel) a technical unit from possible acts of sabotage, even if its control network has already been corrupted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

Exemplary embodiments of the invention are described in more detail below with reference to figures, in which:

FIG. 3 shows a schematic diagram of the method and the systems involved.

DETAILED DESCRIPTION OF THE PREFERRED EMBODIMENTS

Figure 1:
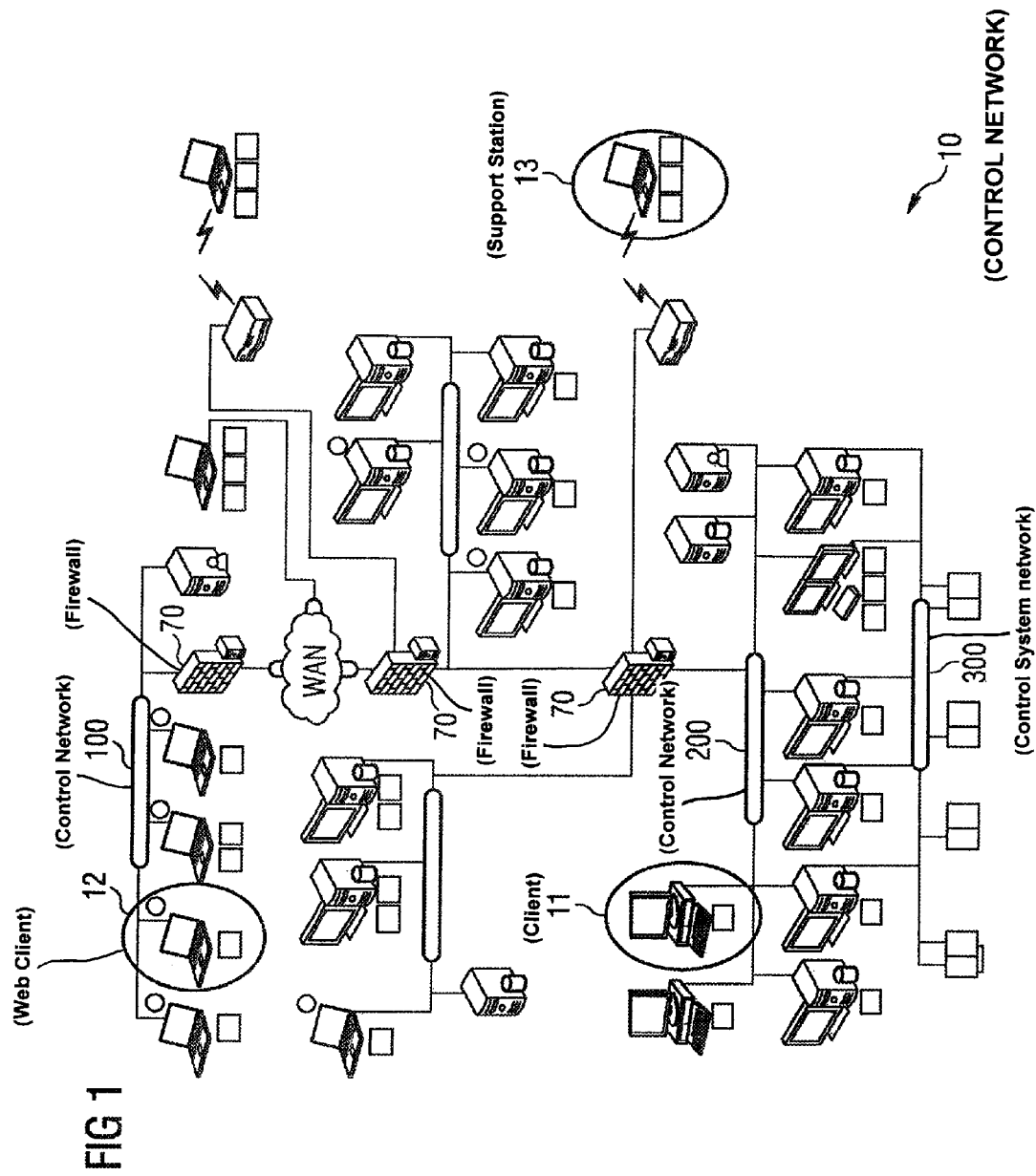
FIG. 1 shows a control network with devices, which can in some instances be taken over by an attacker.

FIG. 1 shows a control network 10 that consists of a number of interlinked networks, including a corporate control network 100 (for example, as part of an Enterprise Resource Planning (ERP) or Manufacturing Execution Systems (MES) system), a process control network 200 and a control system network 300. The control network 10 also contains a number of authorized observation or control stations, including a client 11, a web client 12 and a support station 13 for remote maintenance access. As a security precaution, a number of firewalls 70 are provided in the control network 10. FIG. 1 shows an instance where an attacker has already successfully taken over an authorized observation or control station, for example, the client 11 or a server in the process control network 200, the web client 12 in the corporate control network 100, or the support station 13.

The attacker can now explore or even manipulate the parts of the technical unit covered by the authorized observation or control station they have taken over. The attack here is not directed at the control network 10 but, instead, using or abusing the control network 10, at the technical unit itself. The attack here is limited to regular commands and communication messages. Cryptographic checksums and signatures can be calculated correctly by the authorized observation or control station that has been taken over. The communication paths are complied with correctly, as set out during configuration. Both signature-based intrusion detection systems and self-learning intrusion detection systems based on byte sequences are therefore practically unable to detect such an attack.

The observation and control stations therefore have to be protected, particularly when they are located outside the control network 10 with its relatively effective physical and information-related protection.

Figure 2:
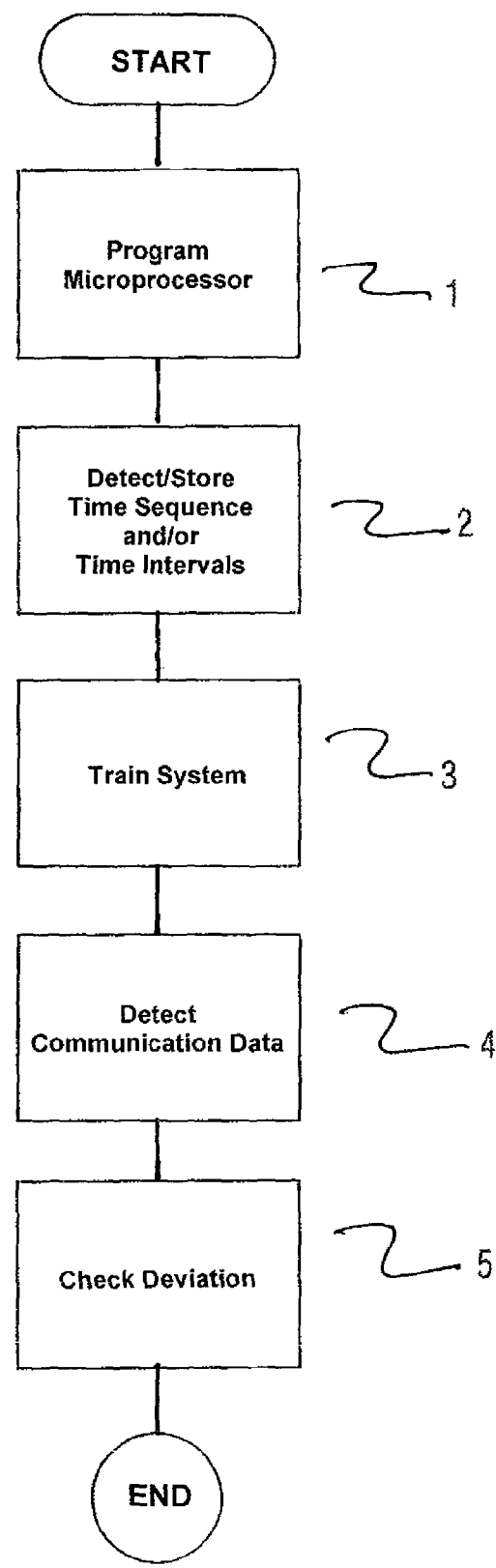
FIG. 2 shows a flow chart of the method in accordance with an embodiment of the invention.

FIG. 2 shows a flow chart of the method for anomaly detection in the control network 10. With specific reference to FIG. 2, shown therein is a first step 1, a second step 2, a third step 3, a fourth step 4 and a fifth step 5 of the method in accordance with an exemplary embodiment. With the exception of the first step 1, these steps are also shown in FIG. 3, which illustrates the method as well as an anomaly detection system 50 and the control network 10 schematically.

In the first step 1 shown in FIG. 2, communication data is detected in the control network 10, for example, network traffic data.

In the second step 2 shown in FIG. 2 and FIG. 3, a time sequence and/or time intervals of correct messages in the communication data is/are detected and stored in training data 30.

In the third step 3, an anomaly detection system 50 is trained using the training data 30. The anomaly detection system 50 is thus trained in an initial training phase based on of a secure control network 10 that has not yet been contaminated by hostile attacks. To this end, the anomaly detection system 50 contains, for example, a neural network 60, which is trained. However the anomaly detection system 50 can also be implemented using a different technology, such as a support vector machine.

In the fourth step 4, current communication data 40 is detected in the control network.

In the fifth step 5, the anomaly detection system 50 is used to check the time sequence and/or time intervals of the correct messages in the current communication data 40 for a deviation from the training data 30. Such a deviation is detected, if a unit 20 shown in FIG. 3, in particular one of the observation or control stations shown in FIG. 1, in the control network 10 has been taken over by an attacker or otherwise manipulated or has a defect.

The control network 10 is not limited to industrial automation (including energy and water distribution or pipelines) but can also relate to other areas and sectors, such as building automation networks or telecommunication networks.

In a second alternative exemplary embodiment, an operator at the client 11 can display both an overview of an entire technical unit and detailed information about its sub-regions. For monitoring purposes the operator will normally look at a newly called up image for several seconds at least, before calling up a further image. However, if the client 11 requests a number of images within a short time (for example, less than one second), this can no longer be ascribed to the normal and careful activity of the operator but instead indicates that, for example, a malicious program is scanning the technical unit with a view to collecting a lot of information in the shortest possible time.

The presently contemplated alternative embodiment is implemented by programming a microprocessor to detect communication data in the control network 10 and to store time intervals of correct messages (contained in the communication data) in the training data 30. The correct messages are messages requesting the images. Normally, the time interval is more than one second. This is stored in the training data 30, which is used to train the anomaly detection system 50. If during a later operating phase the client 11 requests a number of images within a short time, this becomes visible in the current communication data 40 in the control network 10. The prior training allows the anomaly detection system 50 to detect this deviation from the learned time interval of the corresponding messages and to conclude from it that the client 11 has been taken over by an attacker. To detect the deviation after prior training, the anomaly detection system 50 is programmed, for example, as a neural network 60 or as a support vector machine.

A third exemplary embodiment is provided, which can be implemented as an alternative or in addition to the above described second exemplary embodiment. In accordance with the presently contemplated exemplary embodiment, the web client 12 regularly (e.g., every one or two seconds) requests current values of an image being looked at by an operator from a server in the communication network 10. This request occurs automatically without operator intervention. As a result, the intervals between the messages are always exactly the same (apart from a possible jitter in the network).

A change between different images is in contrast generally initiated by the operator and will therefore occurs at quite irregular intervals. If however this change occurs at precisely identical time intervals, it must be program-controlled. This indicates automation (possibly without permission) of the display change by the operating personnel, to conceal a physical absence from the web client 12, or a web client 12 that has been taken over by an attacker wishing to obtain information about the technical unit and to this end requesting images at short intervals.

With the implementation the presently contemplated exemplary embodiment it should be noted that in the training data 30 the time intervals between messages signaling a change between different images are rather irregular, as can be expected when the request is made by an operator. This enables the trained anomaly detection system 50 to detect discernibly regular time intervals and conclude an attack from these.

In a fourth exemplary embodiment, which again can be implemented as an alternative or in addition to the previous described exemplary embodiments, a regular or accelerated repetition of the same command (e.g., command "close valve 123", every 2 seconds) is detected by the anomaly detection system 50 as a deviation and therefore as an indication of a malfunction of a unit part or an attack. Before the anomaly detection system is trained, it is ensured that such a sequence of commands is not contained in the training data 30.

As a basis in all the exemplary embodiments, an anomaly detection system 50 is used, which records and analyzes a data stream between the observation or control station (client 11, web client 12, support station 13) and respective servers in the control network 10 as communication data.

Particularly suitable for implementing the method are algorithms, which a) in a learning phase (first step 1, second step 2, third step 3), can capture sequences (i.e. time orders) of messages including their time intervals generally as training data 30, and b) in an operating phase (fourth step 4, fifth step 5) can detect sequences in the current communication data 40, which deviate significantly from the training data 30 either in respect of the sequence of the individual messages and/or in their time intervals.

One known approach to this is what is known as episode rule mining, which examines the frequency of successive events at time intervals and is also suitable for classification purposes. Episode rule mining is known as the Mannila algorithm from Mannila, H.; Toivonen, H.; and Verkamo, A.: "Discovery of frequent episodes in event sequences", in Data Mining and Knowledge Discovery 1, Kluwer Academic Publishers, 1997, pp. 259-298.

In a data record, the Mannila algorithm finds frequent episodes of the form: $X, Y \rightarrow Z$ (s, k, w), where X, Y and Z are certain numbers of events occurring in a time window of length w in the sequence s is what is known as support (the relative frequency of X . . . Y . . . Z in the overall number) and k is confidence=$s(X \cup Y)/s(X \cup Y \cup Z)$. Confidence k therefore measures the relative frequency of the occurrence of the conclusion subject to the premises (X, Y). Only of interest here are episodes having a certain minimum frequency smin and confidence kmin.

X, Y and Z numbers of events (numbers of messages) found in the recording of the communication data, which correspond to an information flow to transmit three images Bx, By and Bz, are transferred to the second exemplary embodiment. If these images are required for a graphic display by the client 11, this occurs within a short time window w. If the graphic is also repeatedly updated, a frequent episode X, Y, Z already results, as found by the algorithm.

A total number of episodes found in the communication data therefore characterizes a normal data flow including normal time intervals in the control network 10 of the technical unit.

When much longer episodes are observed in the current communication data 40 in the same time window w during the operating phase, this indicates the attack described in the second exemplary embodiment. Quite new episodes which should not occur based on the training data 30 can also indicate an attack.

As an alternative to the Mannila algorithm, the disclosed embodiments in accordance with the method of the invention can also be implemented based on conventional probabilistic methodologies, such as extended Markov models (see for example, Ge, X.; Smyth, P.: "Deformable Markov model templates for time-series pattern matching", in Proceedings of the $6^{th}$ ACM SIGKDD International Conference on Knowledge Discovery and Data Mining, Boston, Mass., August 2000, pp. 81-90). These and similar algorithms are already used successfully in other fields for comparable classification tasks, for example, to analyze EKG and EEG signals for a brain/computer interaction, for pattern identification in financial data, for voice recognition, for automatic classification of pieces of music and to analyze the click behavior of players in multi-player games, as well as in payment models on the Internet (see Schlüssler, T.; Goglin, S.; Johnson. E.: "Is a bot at the Controls? Detecting Input Data Attacks", in Proceedings of the $6^{th}$ ACM SIGCOMM NetGames, Melbourne, Australia, September 2007).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting anomalies in a control network, comprising:
   detecting, by a microprocessor, communication data in the control network;
   detecting, by the microprocessor, time intervals between correct messages in the communication data, and storing into training data the time intervals between correct messages in the communication data;
   training, by the microprocessor, an anomaly detection system using the training data;
   detecting, by the microprocessor, current communication data in the control network and time intervals between current images being viewed in the communication system;
   checking, by the anomaly detection system, the time intervals between correct messages in the current communication data and the time intervals between current images being viewed to detect a deviation from the training data; and
   identifying, by the anomaly detection system, an anomaly in response to the detected deviation from the training data.

2. The method as claimed in claim 1, wherein, during said step of checking, the anomaly detection system detects a deviation, when a unit in the control network has been taken over by an attacker or has been changed by a user without permission.

3. The method as claimed in claim 1, wherein one of
   (i) the anomaly detection system comprises a network-based intrusion detection system, and the communication data and the current communication data comprise network traffic data, and
   (ii) the anomaly detection system comprises a device-based intrusion detection system, and the communication data and the current communication data describe a communication behavior of a device.

4. The method as claimed in claim 1, wherein during said step of detecting the time intervals between the correct messages in the communication data is based on one of episode rule mining and a probabilistic method.

5. The method as claimed in claim 1, wherein the anomaly detection system comprises at least partially one of a neural network and a support vector machine.

6. The method as claimed in claim 1, wherein the control network comprises a network configured to monitor and control one of industrial automation and building automation.

7. The method as claimed in claim 2, wherein the unit comprises one of an observation station and a control station.

8. The method as claimed in claim 3, wherein the device comprises a server.

9. The method as claimed in claim 4, wherein the episode rule mining is a Mannila algorithm.

10. A non-transitory computer-readable data medium encoded with a computer program executed by a computer that causes detect anomalies in a control network, the computer program comprising:
    program code for detecting, by a microprocessor, communication data in the control network;
    program code for detecting, by the microprocessor, the time intervals between correct messages in the communication data, and storing into training data the time intervals between correct messages in the communication data;
    program code for training, by the microprocessor, an anomaly detection system using the training data;
    program code for detecting, by the microprocessor, current communication data in the control network and time intervals between current images being viewed in the communication system;
    program code for checking, by the anomaly detection system, the time intervals between correct messages in the current communication data and the time intervals between current images being viewed to detect a deviation from the training data; and
    program code for identifying, by the anomaly detection system, an anomaly in response to the detected deviation from the training data.

11. The method as claimed in claim 4, wherein the probabilistic method includes extended Markov models.

* * * * *